Aug. 28, 1934.  C. B. HUNTMAN  1,971,957
STABILIZING SHOCK ABSORBING APPARATUS FOR MOTOR VEHICLES
Original Filed Aug. 24, 1925  3 Sheets—Sheet 1
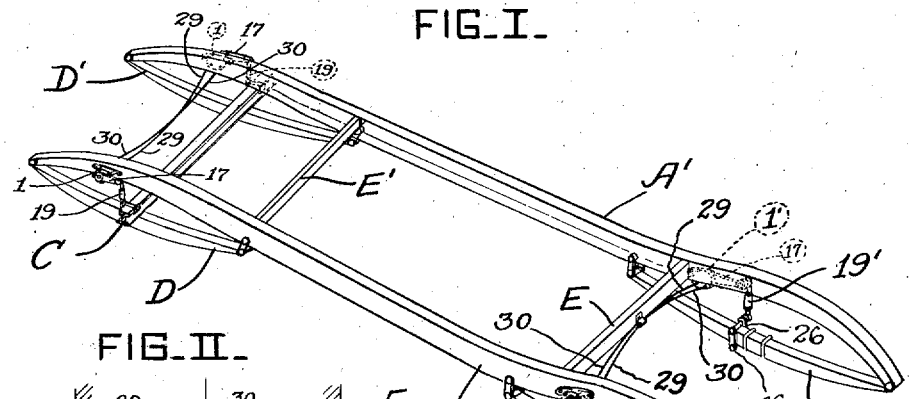
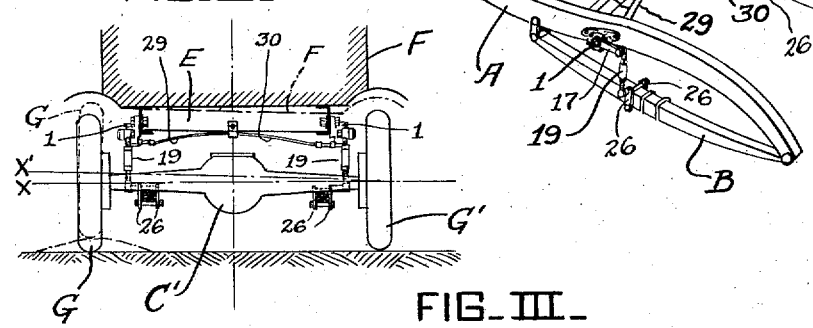
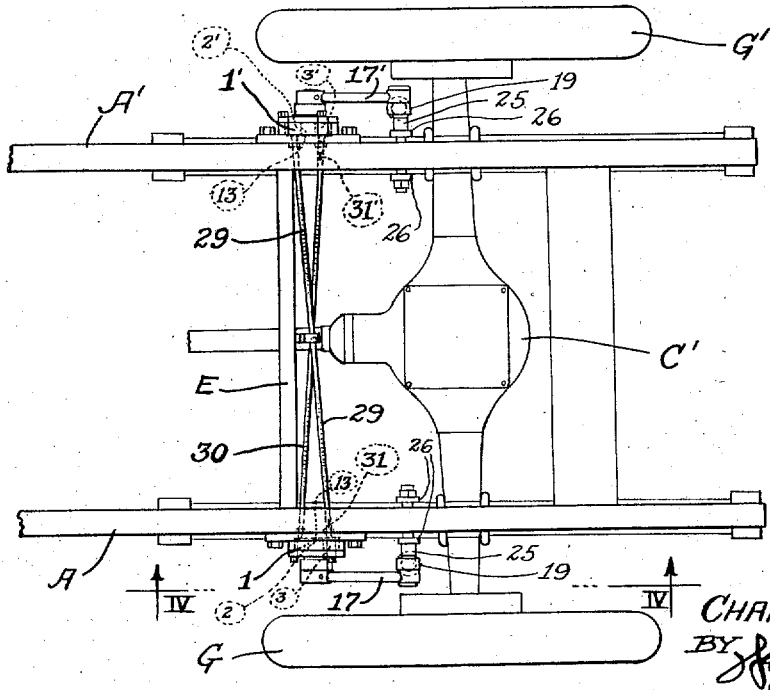
INVENTOR
CHARLES B. HUNTMAN
BY
ATTORNEY Aug. 28, 1934.   C. B. HUNTMAN   1,971,957
STABILIZING SHOCK ABSORBING APPARATUS FOR MOTOR VEHICLES
Original Filed Aug. 24, 1925   3 Sheets-Sheet 2
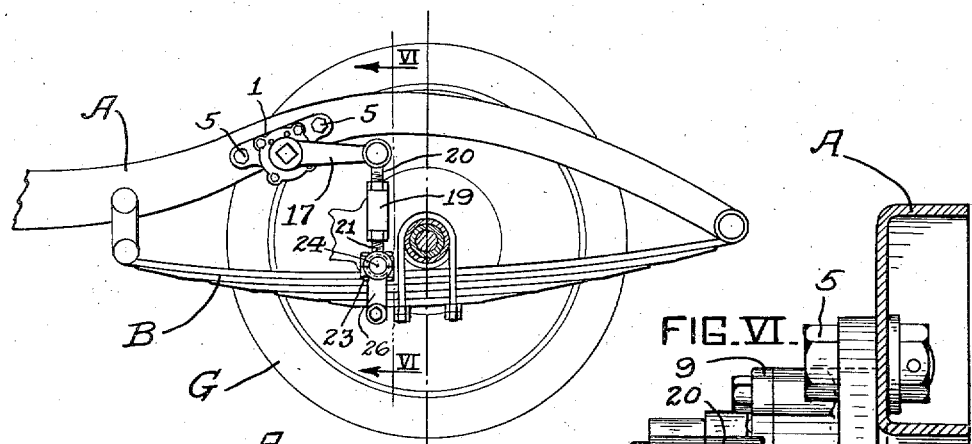
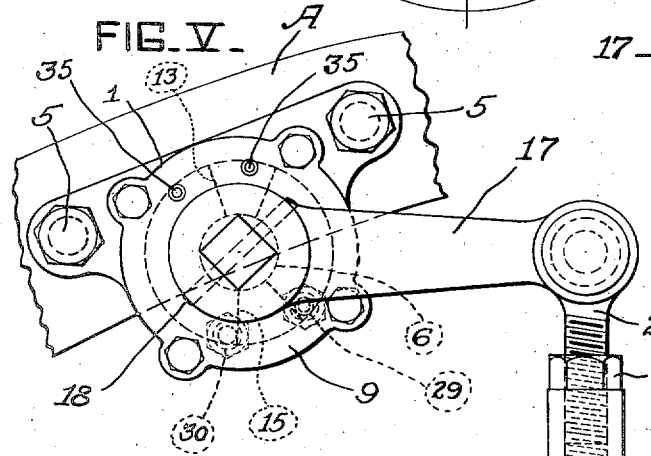
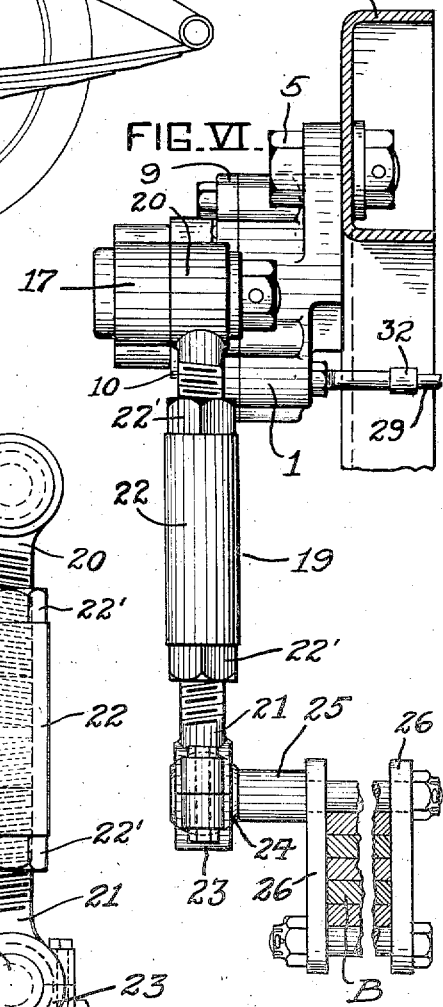
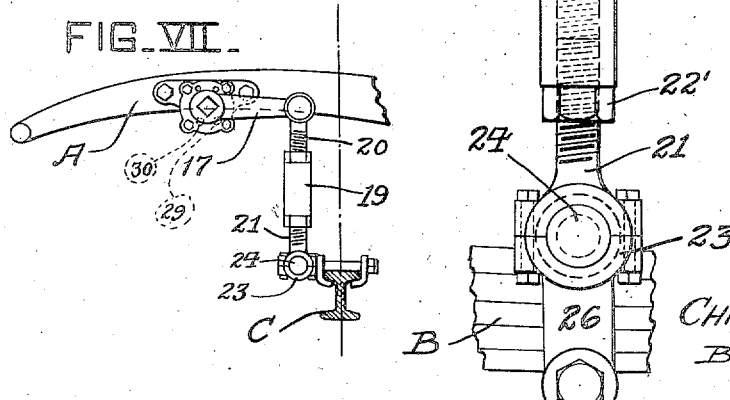
INVENTOR.
CHARLES B. HUNTMAN
BY
his ATTORNEY Aug. 28, 1934.    C. B. HUNTMAN    1,971,957
STABILIZING SHOCK ABSORBING APPARATUS FOR MOTOR VEHICLES
Original Filed Aug. 24, 1925    3 Sheets-Sheet 3
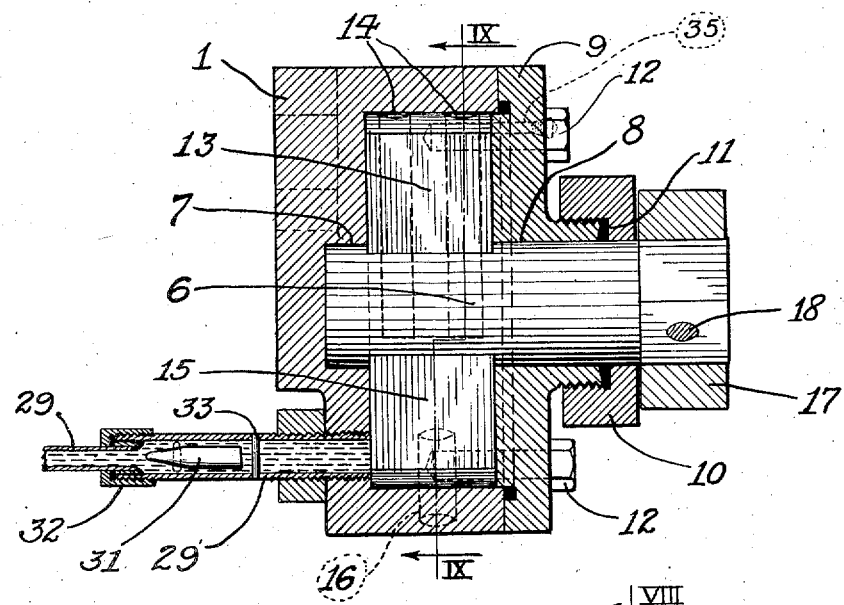
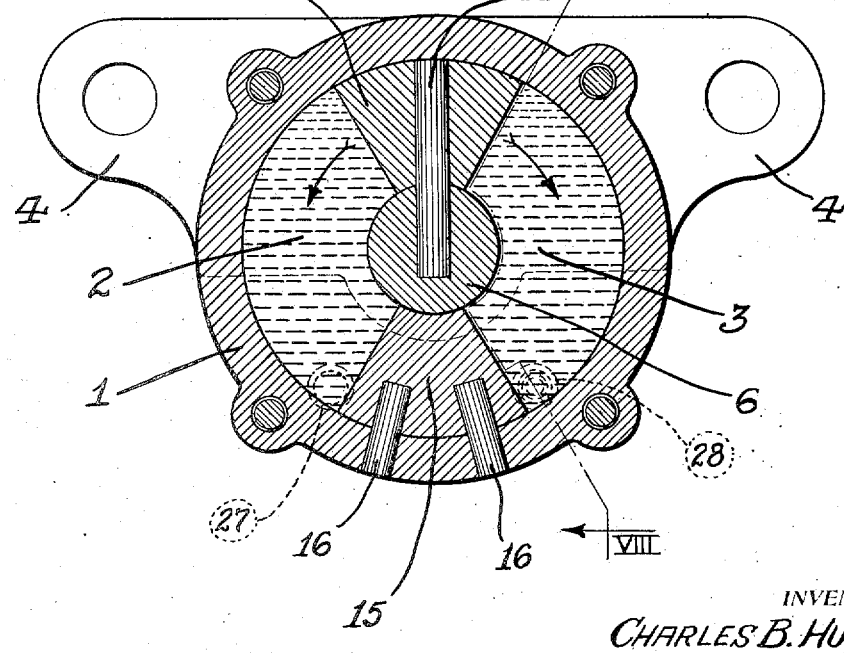
INVENTOR
CHARLES B. HUNTMAN
BY
ATTORNEY Patented Aug. 28, 1934

1,971,957

UNITED STATES PATENT OFFICE 1,971,957

STABILIZING SHOCK-ABSORBING APPARATUS FOR MOTOR VEHICLES

Charles B. Huntman, New York, N. Y., assignor to Huntman Stabilizer Corporation

Application August 24, 1925, Serial No. 51,908
Renewed January 18, 1933

20 Claims. (Cl. 267—11)

The invention relates to the equalizing or balancing of shocks such as are involved in motor cars when wheels on one side are displaced by the uneven contour of the road, or when the centrifugal strain tends to careen the body when a car at speed is deflecting its course. My invention deals with the method of absorbing such shocks or strains, balancing the effect of the strains on both sides of the car, dampening the reaction of any wheel or body displacement due to such shocks, and various other advantages which will appear from a more detailed description hereinafter set forth, and, furthermore, involves apparatus to accomplish these results.

It is known that devices such as shock absorbers or snubbers are well known for the purpose of resisting sudden displacement of wheels relative to the body or frame of cars and to dampen the action of a wheel or spring, which devices invariably involve in each individual device for each wheel self-contained frictional or like shock-absorbing means or motion retarding means, but functioning solely in conjunction with the displacement of a specific wheel, or simply adding increased spring suspension of both wheel suspensions.

One of the main features of my invention involves the transmission of the shock and consequent relative movement of the wheel with respect to the frame on one side of the car, to a device on the opposite side of the car where the relative position of regular suspension maintaining the axle and frame absorb or resist the action on the opposite side, and, furthermore, to interconnect both sides of the car as to the suspension of axles or wheels in such a manner that the displacement on either side by uneven road surface will encounter reaction by the regular axle suspension on the opposite side, and thereafter will dampen the return movement of the displaced parts on both sides, furthermore accomplishing a similar result when the relative displacement is due to the tendency of the body or the superload on a chassis to cause uneven deflection of axle carrying springs on opposite sides due to the centrifugal force when speeding around curves or the like. Many variations in the apparatus may be made to practice this method of laterally stabilizing shock-absorbing in vehicles, aircraft landing gear, or the like, and to clearly set forth the invention it will now be described in a single form of embodiment in a usual type of motor car chassis, while the mechanism and functioning would of course be varied when the invention is embodied in the various other ways dependent upon the desired positioning of parts for convenience of design.

A particular embodiment of my invention is illustrated in the accompanying drawings, in which:

Fig. I is a perspective of parts of a chassis showing the equalizer connections between springs or axle to the sills and their interconnection between the sides.

Fig. II is a rear view diagrammatic, for use in explaining the action of the equalizer.

Fig. III is a plan view on a larger scale of the rear end of a chassis embodying the equalizer mechanism.

Fig. IV is a side elevation, in section IV—IV of Fig. III.

Fig. V is a fragmentary side elevation of the shock-transmitting linkage on one side, on a larger scale.

Fig. VI is a section on line VI—VI of Fig. IV, showing the shock-transmitting linkage on the same scale as Fig. V, in end view.

Fig. VII is a side elevation of the shock-absorbing linkage interconnecting sill and axle, on a smaller scale.

Fig. VIII is an approximate vertical section of the shock-absorbing chamber on line VIII—VIII of Fig. IX.

Fig. IX is a vertical section longitudinal of the car of the shock-absorbing element on line IX—IX of Fig. VIII.

This embodiment of my invention is shown in connection with the sills A—A' of a chassis with rear springs B—B', front axle C and front springs D—D', and frame members E connecting the sills in the rear and E' in the front with a superposed body F, rear axle C', and wheels G—G'.

The shock-absorbing elements and linkage interconnecting the sills or body with axle ends and the equalizing interconnection between shock-absorbing mechanism on each side of the vehicle, involve the casing 1 having oil chambers 2 and 3, with a preferably integral base 4 constituting means for securing this part as by bolts 5—5 to the sills A—A' of the chassis. An oscillating shaft 6 is mounted in bearing 7 in the casing 1 and bearing 8 in a casing-cover 9 having a packing gland 10 to form an oil-tight joint, as by packing 11 around the shaft 6 to hold the oil in the chambers 2 and 3, while bolts 12 securely hold the cover 9 to the casing. A reciprocating piston 13 is secured by dowels 14 to the shaft 6, while an abutment 15 fitting the interior of the chamber 3 is secured by dowels 16 to the interior wall of the casing 1. This piston and abutment extend preferably about thirty degrees around the shaft, and in the initial or normal position the piston 13 is diametrically opposite the abutment 15, thereby leaving on each side about one hundred and twenty degrees of space in the form of a segmentary chamber which is adapted to confine oil or other like fluid transmission medium such as is used in gun recoil cylinders, or fluid-power mechanism preferably non-freezing mixtures, such as alcohol with castor oil or glycerine, or medium body lubricating oil. The linkage to transmit shock by relative movement of spring or axle with respect to the sills, comprises the crank-arm 17 on the left side and crank-arm 17' on the right side, each of these cranks having a hub adapted to fit the end of shaft 6 and to turn therewith by a square or other polygonal end engagement and suitably secured as by pin 18, while an adjustable link 19 has threaded pivot stubs 20 and 21, with interconnecting sleeve 22 and lock-nuts 22', similar to a turn-buckle, and pivot stub 21 has preferably a split bearing 23 adapted to engage a part spherical end 24 on the stud 25 formed for convenient attachment like clamps 26 to the spring such as B, in a position at a part of the spring approximating major deflection by shock of uneven roads practically equaling the entire displacement of axle end and wheel.

In the oil chambers 2 and 3 the sluggish medium such as oil, is completely confined by the piston 13 and the abutment 15 and the shaft 6 and the inner walls of the casing and cover,—with the essential exception of a vent or hole 27 in chamber 2, and 28 in chamber 3 adjacent the angle formed by the wall of the abutment with the inner wall of the casing, which vents register respectively with pipes 29 and 30 leading respectively from the rear of the casing 1 on the left side of the chassis, as shown, and the forward side of the abutment, but these pipes are transposed or crossed so that pipe 29 leads to the forward side of the abutment, and therefore to chamber 2' in the casing 1' on the righthand side of the chassis, while the pipe 30 leads to the rear chamber 3' in the casing 1' on the righthand side of the chassis,—when the shock-transmitting crank 17 extends rearwardly from the casing on both sides.

Close to the junction of these pipes with the casing, one of the pipes on each side preferably has a one-way check comprising a float 31 with a reduced end adapted to reduce the flow section in a restricted passage 32, when the point of the float 31 is driven by the oil flow into the restricted passage 32, but when driven in the opposite direction with the float engaging a stop 33, the free-flow of the oil or like transmission fluid is permitted. This one-way fluid-retarding-valve is built into the connection of tube 29, in the case of the arrangement as illustrated in Figs. I, III and IV, on the left side of the chassis, and a like fluid-flow-varying-valve is built into the end of pipe 30 on the righthand side of the car, for reasons of functioning, which will hereinafter be described.

It will thus be seen that the mechanism as described in detail will operate in the following manner: When a chassis, as partly illustrated in Fig. III, is moving over a road, should the wheel G strike an obstruction and be raised, through link 19 the lever 17 is rocked upward with the compression of spring B toward the sill A. This movement of the lever drives the oil in chamber 2 freely through the pipe 30 into the chamber 3' in the casing 1', and forces the lever 17' upwards, all on the opposite side of the vehicle, in other words, giving the same angular direction of rotary reciprocation to the lever on the opposite side of the vehicle, thereby tending to draw the spring B' toward the sill A', and the resistance on this opposite side is the shock-absorbing resistance to the tendency of deflection due to an obstruction on the other side, and vice versa. The moment the wheel G has passed over the obstruction, the reverse tendency becomes effective, namely, lever 17 drops with the drop of the axle and spring B, and the piston 13 being oscillated back toward its normal or initial position tends to drive the oil in chamber 3 through the hole 28 and the pipe 29, but the check-valve 31 is instantly floated into the position restricting the free flow of oil, and thereby it dampens the return action of the piston and the return action of the lever 17, while at the same time on the opposite side of the car the tendency of lever 17' to return is checked by the floating-valve in the tube 30 close to its connection with the chamber 3'.

While the shock due to displacement of a wheel on one side is thus absorbed or retarded by the functioning of the mechanism on the opposite side, any slight movement on the opposite side tends to relatively pull up the axle toward the body or superstructure of the chassis, but when the obstruction is passed the reaction is immediate and this pulling up on the opposite side anticipates the recoil of the spring and its effect on the obstructed side with the consequent result that with the immediate resumption of motion over the road surface equally level on both sides, the compensation of action interconnected from side-to-side has a net result of preventing the rocking of the body, and this effect is by anticipating the respective reactions and dampening the vibration of the springs relative to the sills and dampening the tendency to lateral motion or rocking of the mass or the main weight on the sills such as body or load. Thus instead of the mass of the vehicle tending with its inertia against vertical motion, simply to resist the upward movement of one wheel, the interconnection from side-to-side of my mechanism utilizes the inertia of the mass of the body against lateral rocking. While in effect this tends to equalize the motion of the opposite axle ends from a normal horizontal, it entirely equalizes the effect upon the mass of the body on the respective sides, thereby preventing the actual rocking of the body on the line of direction of motion, and, furthermore, by the equalizing of the effects of rough roads or centrifugal force on turns, it prevents any cumulative vibrating motion of the body and quickly deadens or dampens the displacement of the body so that the general effect becomes one of perfectly easy riding.

In the diagrammatic view Fig. II, the above will be understood in explanation of the action when a wheel on one side rises over an obstruction. The momentary displacement of the axis from X to X' causes by my equalizer a tendency, as shown in dash-dot line on the right side of Fig. 11, to depress the body on the opposite side, but it actually raises the axle on that other side a little freer from the ground, but before any such effect is felt in the body, the obstruction having been passed, the recoil reverses the action, and in view of the time-element involved in the functioning of the mechanism the net result is a practical complete stabalizing of the motion of the body with the forward motion of the car at all reasonable speeds of operation. For example, in the case of a relatively considerable speed for a given car the mass of the body moving in a straight course substantially horizontal, has great resistance to deflection compared with the relatively light weight of the wheel and the axle end, so that in practice at such speeds no actual motion of the body is felt, but the shock-absorbing accomplished for one side by the mechanism on the other involves the spring resistance, and any such strain to compress the spring and draw it nearer the sill simply tends to relieve the pressure of that wheel on the ground without deflecting the body at such speeds from its straight course.

Besides the inherent very remarkable qualities of this mechanism for comfort in riding, there is a great reduction in the strain on the parts and a saving in wear and tear, and in the practical development of the invention it has been found that the easy riding and other advantages can be greatly improved and realized by my mechanism with curtailing of some of the other devices that have heretofore been added with added cost and expense in the futile attempt to accomplish these results. The reduction in the number of spring leaves, the discarding entirely of supplementary spring members, or rubber buffers, are only a few of the features which may here be mentioned.

It will be noted, furthermore, that when a chassis is laterally unequally loaded, even when at rest, the depression on one side cannot exist without a compensating depression of the spring on the other side, and the only slight effective depression is due to tire contact depression. In the case of the recent adaptation of relatively large diameter tires with much lower air pressure as one-third of that previously used, there has been a greater tendency to body motion, and in that connection it has been found that my invention equalizes, absorbs and stabilizes the bodies of cars in use at speeds which offset the stated defect that has been noted with the larger and lower-pressure tires.

It will be understood that the transmission of the effect on one side to the complementary mechanism on the opposite side may be effected by means of a direct piston action from the spring near the axle, or directly from the axle, and many other variations may be made in the mechanism to fit particular designs and arrangement of the parts of a car or running gear, and the dimensions of linkage or connections will be varied to suit the particular type and weight of car and to suit the desired normal speeds of usage. In the example herein particularly described, the mechanism is designed and functions with all of the stated advantages by having the linkage and the size of oil chamber and piston, as well as the size of interconnecting tubing and check-valve, all substantially as illustrated as to their relative dimensions. Variations in relative dimensions may conform thereto, and will, however be modified in practice for each particular case, and the material and detailed design of parts for the necessary strength, durability and rigidity while satisfactory in the form shown may be varied without departing from my invention.

This equalizing mechanism as shown and described, may be made complete and attached to existing cars, and in so doing may displace various other fitments now thought necessary, and not alone accomplish the shock-absorbing in old types of individual wheel devices, but provides as hereinbefore set forth those and many other advantages not heretofore realizable by any mechanism previously used or known. When made for embodiment in the original construction of cars it may be simplified in weight of material and workmanship, and the essential parts may be more suitably protected or embodied for more equal transmission of strains to sill, axle or wheels, without departing from the spirit of my invention.

What I claim and desire to secure by Letters Patent is:

1. In a vehicle, means for substantially equalizing the vertical displacement shock on the wheel of one side of the vehicle with respect to the opposite side of the vehicle, comprising means freely transmitting the force of vertical displacement on one side to the opposite side, spring suspension means on each side responsive to the wheel displacement relative to the vehicle cooperating with said means for freely transmitting the force from side-to-side, and means for thereafter more gradually permitting the return reactive force of the spring suspension means.

2. A stabilizer for wheeled running gear to counteract the rocking tendency of bodies or loads spring-supported above the road wheel axles, comprising a shock absorber inter-connecting one road wheel axle on one side directly with the superposed body or load frame, a shock absorber inter-connecting the wheel axle on the opposite side with the superposed body or load frame, an inter-connecting means between the shock absorber on one side to the shock absorber on the other side for free transmission of shock from one absorber to the other, said inter-connecting means operating to provide equal damping on both of the wheels on recoil more gradual than the initial shock.

3. In a motor car an equalizing mechanism for spring shock displacements on the opposite sides of the vehicle, including a shock absorber responsive to shock on each side of the vehicle and dampening the recoil of the spring on its side of the vehicle, inter-connecting means between the shock absorbers from side to side permitting freely transmitting the force due to vertical displacement of the spring in one direction on one side to the shock absorbing means responsive to shock on the opposite side of the vehicle, said side-to-side transmitting means also cooperating with the shock absorbers on either side for thereafter transmitting return reactive force from the opposite side to the side of original shock, whereby the shock absorption is equalized from side to side of the vehicle to minimize the rocking tendency of the superposed mass of the load or body of the motor car.

4. A device for equalizing a substantially vertical displacing shock on the wheel on one side of a vehicle running gear having spring suspension between the unsprung running gear and the vehicle body or frame, consisting of a shock absorber between the vehicle body or frame and unsprung running gear at each side of the vehicle, each of said shock absorbers by inter-connection between said shock absorbers transmitting vertical displacement of one of the wheels to the shock absorber at the wheel on the opposite side, said inter-connection being so constructed that thereafter the recoil on both sides of the vehicle is more gradually transmitted to the connections between the unsprung running gear and the load frame.

5. A stabilizer for wheeled running gear to counteract the rocking tendency of bodies or loads spring-supported above the road wheel axles, comprising a shock absorber inter-connecting one road wheel axle on one side with the super-posed body or load frame, a shock absorber inter-connecting the wheel axle on the opposite side with the superposed body or load frame, an interconnection between the shock absorber on one side to the shock absorber on the other side reacting to transmit the recoil of the shock absorber on one side to the shock absorber on the opposite side, and means associated with said inter-connection to retard or dampen the effect of the recoil.

6. In a motor car an equalizing mechanism for spring shock displacements on the opposite sides of the vehicle, including a shock absorber responsive to shock on each side of the vehicle and dampening the recoil of the spring on its side of the vehicle, interconnecting means between the shock absorbers from side to side permitting freely transmitting the force due to vertical displacement of the spring in one direction on one side to the shock absorbing means responsive to shock on the opposite side of the vehicle, and a device in said side-to-side transmitting means between the shock absorbers on either side for thereafter dampening the return reactive force from the opposite side to the side of original shock, whereby the shock absorption is equalized from side to side of the vehicle to minimize the rocking tendency of the superposed mass of the load or body of the motor car.

7. A device for equalizing a substantially vertical displacing shock on the wheel on one side of a vehicle running gear having spring suspension between the unsprung running gear and the vehicle body or frame, consisting of a shock absorber between the vehicle body or frame and a wheel at each side of the vehicle, one of said shock absorbers transmitting vertical displacement of one of the wheels freely to the shock absorber responsive to the shock at the wheel on the opposite side, and interconnections between the two shock absorbers to thereafter transmit the recoil from one side of the vehicle more gradually to the connections between the unsprung running gear and the load frame on the side of original shock, whereby displacement of a wheel on either side has a lesser tendency to rock the superposed body or load.

8. A vehicle chassis construction having in combination, a frame, an axle extending transversely of the frame, suspension springs on opposite sides of the frame connecting the latter to the axle, levers pivoted adjacent opposite sides of the frame, means connecting the free ends of the levers to the axle including links having the upper ends secured to the free ends of the levers for pivotal movement about axis extending substantially parallel to the axis of the pivotal support of the levers and having the lower ends secured to attaching means at the axle for lateral oscillation relative to the axle, and force transmitting means extending transversely of the frame and connecting the levers so constructed and arranged whereby movement of either of said levers is transmitted to the other.

9. In a vehicle, a fluid shock absorber on each side, fluid connections between the shock absorbers on both sides providing relatively free movement of fluid in one direction and having means for impeding return-movement of the fluid from the shock absorber on one side to the shock absorber on the other side.

10. In a vehicle, two fluid shock absorbers responsive to shock, respectively on each side of the vehicle, fluid interconnections between said shock absorbers providing free movement of fluid in one direction, whereby each shock absorber is responsive to shock on the opposite side of the vehicle and having means to dampen the reaction from the shock absorber responsive to the shock on one side to the shock absorber responsive to the shock on the other side of the vehicle.

11. A stabilizer for automobiles to minimize rocking tendency of bodies or load, comprising a shock absorber on each side each having a fluid chamber, two fluid connections between the chamber on one side and the chamber on the opposite side, each connection providing free movement of fluid in one direction and means to dampen the return-movement of the fluid in the connection.

12. In a vehicle, means for effecting equalization of shock on suspension members on opposite sides of the vehicle including a fluid shock absorber on each side, a connection between said shock absorbers from one side to the opposite side for relatively free transmission of fluid displacement of one shock absorber on one side to the other side, and means in said connection for dampening the reaction from the opposite side to the side of original shock.

13. In a vehicle in combination with a frame member and an axle member, suspension means for opposing rocking or sidesway including chambers connected to one member, fluid-tight double-acting pistons cooperating with said chambers connected with the other member, means connecting one side of one chamber to the opposite end of the other chamber on the opposite side of the vehicle, and means in said connection to dampen the flow of fluid in said connection in one direction.

14. In a vehicle in combination with the frame and an axle, suspension means opposing sidesway movements comprising chambers connected to the frame, cooperating fluid-tight double-acting pistons connected to the axles, means connecting the one end of chambers at one side of the vehicle with the other end of the other chamber at the opposite side of the vehicle, and means therein for retarding the flow of fluid in one direction.

15. In a motor vehicle, the combination with the frame and axle, of hydraulic shock absorbers connected between the frame and axle, connections between the absorbers and check valves in the connections, said check valves opposing fluid flow between the shock absorbers except in a direction to cause parallel relation of the axle and the frame.

16. In a motor vehicle, the combination with a frame and an axle, of hydraulic shock absorbers connected between the frame and the axle, connections between the shock absorbers through which fluid is free to flow at all times, and valve means in each connection restricting the flow of the fluid therethrough in one direction.

17. In a motor vehicle, the combination with a frame and axle means, of a pair of hydraulic shock absorbers connected to the axle means and to the frame, said shock absorbers each having a working chamber and a piston in the chamber, and means establishing fluid connections between the working chambers whereby pressure in either chamber will always be opposed by the other shock absorber but to a greater extent during movement of the pistons in one direction.

18. A motor car equalizing mechanism comprising an axle and a superposed body or load frame spring-suspended from the axle, a shock absorber between the axle on one side and the superposed body frame including an oil chamber responsive to the displacement of the axle end relative to the frame, an oil chamber forming part of a shock absorbing connection at the other end of the axle to the superposed body frame, a free connection for the passage of oil from one chamber to the shock absorbing chamber on the opposite side and a return connection between said chambers having predetermined restriction, whereby a dampening of the reaction of the shock absorbing oil chamber on one side is effected with uneven deflection of the spring-suspension on either side.

19. A stabilizer for automobiles to equalize the rocking tendency of bodies or load, comprising a substantially incompressible liquid chamber and piston on each side interconnecting the load with each spring suspended axle end, a liquid interconnection between the oil chambers of both sides whereby displacement of the spring suspension on one side is freely transmitted to and resisted by the opposite liquid chamber, and dampening means in the interconnections retarding the reaction from said chamber to the side of original displacement.

20. A stabilizer for automobiles to minimize the rocking tendency of bodies or load, comprising a shock absorber responsive to shock on one side and a shock absorber responsive to shock on the other side, each having a fluid chamber, fluid interconnections between the chambers of said shock absorbers, each interconnection providing for free movement of fluid in one direction and means to dampen the return-movement of the fluid in the other direction between the chambers respectively reacting to shock on opposite sides of the vehicle.

CHARLES B. HUNTMAN.

DISCLAIMER 1,971,957.—*Charles B. Huntman*, New York, N. Y. STABILIZING SHOCK-ABSORBING APPARATUS FOR MOTOR VEHICLES. Patent dated August 28, 1934. Disclaimer filed December 31, 1943, by the assignee, *Huntman Stabilizer Corporation*.

Hereby enters this disclaimer to claim 8.

[*Official Gazette February 1, 1944.*]

er extent during movement of the pistons in one direction.

18. A motor car equalizing mechanism comprising an axle and a superposed body or load frame spring-suspended from the axle, a shock absorber between the axle on one side and the superposed body frame including an oil chamber responsive to the displacement of the axle end relative to the frame, an oil chamber forming part of a shock absorbing connection at the other end of the axle to the superposed body frame, a free connection for the passage of oil from one chamber to the shock absorbing chamber on the opposite side and a return connection between said chambers having predetermined restriction, whereby a dampening of the reaction of the shock absorbing oil chamber on one side is effected with uneven deflection of the spring-suspension on either side.

19. A stabilizer for automobiles to equalize the rocking tendency of bodies or load, comprising a substantially incompressible liquid chamber and piston on each side interconnecting the load with each spring suspended axle end, a liquid interconnection between the oil chambers of both sides whereby displacement of the spring suspension on one side is freely transmitted to and resisted by the opposite liquid chamber, and dampening means in the interconnections retarding the reaction from said chamber to the side of original displacement.

20. A stabilizer for automobiles to minimize the rocking tendency of bodies or load, comprising a shock absorber responsive to shock on one side and a shock absorber responsive to shock on the other side, each having a fluid chamber, fluid interconnections between the chambers of said shock absorbers, each interconnection providing for free movement of fluid in one direction and means to dampen the return-movement of the fluid in the other direction between the chambers respectively reacting to shock on opposite sides of the vehicle.

CHARLES B. HUNTMAN.

DISCLAIMER 1,971,957.—*Charles B. Huntman*, New York, N. Y. STABILIZING SHOCK-ABSORBING APPARATUS FOR MOTOR VEHICLES. Patent dated August 28, 1934. Disclaimer filed December 31, 1943, by the assignee, *Huntman Stabilizer Corporation.*

Hereby enters this disclaimer to claim 8.

[*Official Gazette February 1, 1944.*]